(12) United States Patent
Hsieh et al.

(10) Patent No.: US 11,846,845 B2
(45) Date of Patent: Dec. 19, 2023

(54) ELECTRONIC SHUTTERS TO ENHANCE PRIVACY

(71) Applicant: Hewlett-Packard Development Company, L.P., Spring, TX (US)

(72) Inventors: Hsing-Hung Hsieh, Taipei (TW); Alexander Wayne Clark, Spring, TX (US); Ann Alejandro Villegas, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/418,879

(22) PCT Filed: Jul. 29, 2019

(86) PCT No.: PCT/US2019/043964
§ 371 (c)(1),
(2) Date: Jun. 28, 2021

(87) PCT Pub. No.: WO2021/021113
PCT Pub. Date: Feb. 4, 2021

(65) Prior Publication Data
US 2022/0146870 A1    May 12, 2022

(51) Int. Cl.
*G02F 1/1334* (2006.01)
*G02F 1/1333* (2006.01)
*G02F 1/1335* (2006.01)

(52) U.S. Cl.
CPC ........ *G02F 1/1334* (2013.01); *G02F 1/13338* (2013.01); *G02F 1/133305* (2013.01); *G02F 1/133528* (2013.01)

(58) Field of Classification Search
CPC ............. G02F 1/133528; G02F 1/1334; G02B 5/3025; G02B 5/3033
See application file for complete search history.

(56) References Cited

U.S. PATENT DOCUMENTS

| | | | |
|---|---|---|---|
| 8,154,582 | B2 | 4/2012 | Border et al. |
| 8,867,015 | B2 | 10/2014 | Posner et al. |
| 9,864,400 | B2 | 1/2018 | Evans et al. |
| 2014/0063049 | A1 | 3/2014 | Armstrong-Muntner |

(Continued)

FOREIGN PATENT DOCUMENTS

| CN | 104780300 A | * | 7/2015 |
|---|---|---|---|
| CN | 209072601 U | * | 7/2019 |

(Continued)

*Primary Examiner* — Jia X Pan
(74) *Attorney, Agent, or Firm* — Quarles & Brady LLP

(57) ABSTRACT

An example of an apparatus is provided. The apparatus includes a display portion and a camera. In addition, the apparatus includes a thin film transistor substrate extending over the display portion and the camera. Furthermore, the apparatus includes an image generation layer disposed under the thin film transistor substrate within the display portion. Also, the apparatus includes a polymer dispersed liquid crystal disposed between the thin film transistor substrate and the camera. The polymer dispersed liquid crystal is to be switched between an opaque state and a clear state. The opaque state is to block the camera from receiving imaging light. The clear state allows light to pass through the polymer dispersed liquid crystal.

12 Claims, 4 Drawing Sheets

(56) References Cited

U.S. PATENT DOCUMENTS

| | | | |
|---|---|---|---|
| 2014/0293187 A1* | 10/2014 | Nam | G02F 1/133528 |
| | | | 349/62 |
| 2017/0187934 A1 | 6/2017 | Kwak et al. | |
| 2018/0210251 A1 | 7/2018 | Kimura | |
| 2020/0142232 A1* | 5/2020 | Demuth | G02F 1/13781 |
| 2021/0072599 A1* | 3/2021 | Mei | G02F 1/133615 |

FOREIGN PATENT DOCUMENTS

| | | |
|---|---|---|
| EP | 2448243 B1 | 8/2015 |
| GB | 2495174 B | 7/2014 |

\* cited by examiner

ELECTRONIC SHUTTERS TO ENHANCE PRIVACY

BACKGROUND

Portable electronic devices such as tablets and smartphones often have display and a camera. The display is typically to generate output for a user and the camera is to receive input. In some portable electronic devices, the camera and the display are on the same surface such that the display may generate output for a user which the camera receives imaging light from the user's face as the user receives the output. For example, this feature may allow a user to carry out a video call with another party where the user may view the other party's image while transmitting the user's own image to the other party.

BRIEF DESCRIPTION OF THE DRAWINGS

Reference will now be made, by way of example only, to the accompanying drawings in which.

DETAILED DESCRIPTION

Many modern portable electronic devices now include a camera facing the user as the user is receiving output via a display. In most portable electronic devices, a camera is disposed adjacent to the display screen. Although the camera is typically controlled electronically, such that it may be powered off during periods of time that the camera is not to be capturing data, many believe that the camera may be hacked such that the camera may be used to capture unauthorized data without the user's consent. Accordingly, this has led some users to cover the camera with a physical object such as a piece of tape or a plastic cover.

To address this concern, some examples of portable electronic devices may include a physical shutter designed as part of the exterior housing of the portable electronic device that may be opened and closed. In additional devices, the shutter may be electronically controlled as well. The electronic control may be provided to a mechanical system to move a piece of plastic or to operate a liquid crystal layer placed in front of a camera.

In the examples described below, an apparatus to enhance privacy on a portable electronic device is provided. In particular, an apparatus using a polymer dispersed liquid crystal (PDLC) instead of a liquid crystal layer is provided. It is to be appreciated that, in some examples, the polymer dispersed liquid crystal may provide the ability to allow polarized light to reach the camera without passing through a polarization filter. Accordingly, more imaging light may arrive at the camera to allow for improved image data. In addition, examples of the apparatus described below may provide a portable electronic device where the polymer dispersed liquid crystal may be controlled on the same circuitry that controls the display. Accordingly, a separate control circuit to operate the polymer dispersed liquid crystal may be consolidated resulting in less wiring and connection ports. In further examples, by integrating the control of the polymer dispersed liquid crystal, the control of the shutter may be carried out without additional drivers to operate a separate subsystem. In still further examples, an apparatus may be provided with a camera shutter made of a flexible substrate allow the shutter to bend to provide an electrical connection to operate the polymer dispersed liquid crystals.

As used herein, any usage of terms that suggest an absolute orientation (e.g. "top", "bottom", "vertical", "horizontal", etc.) are for illustrative convenience and refer to the orientation shown in a particular figure. However, such terms are not to be construed in a limiting sense as it is contemplated that various components will, in practice, be utilized in orientations that are the same as, or different than those described or shown.

Figure 1:
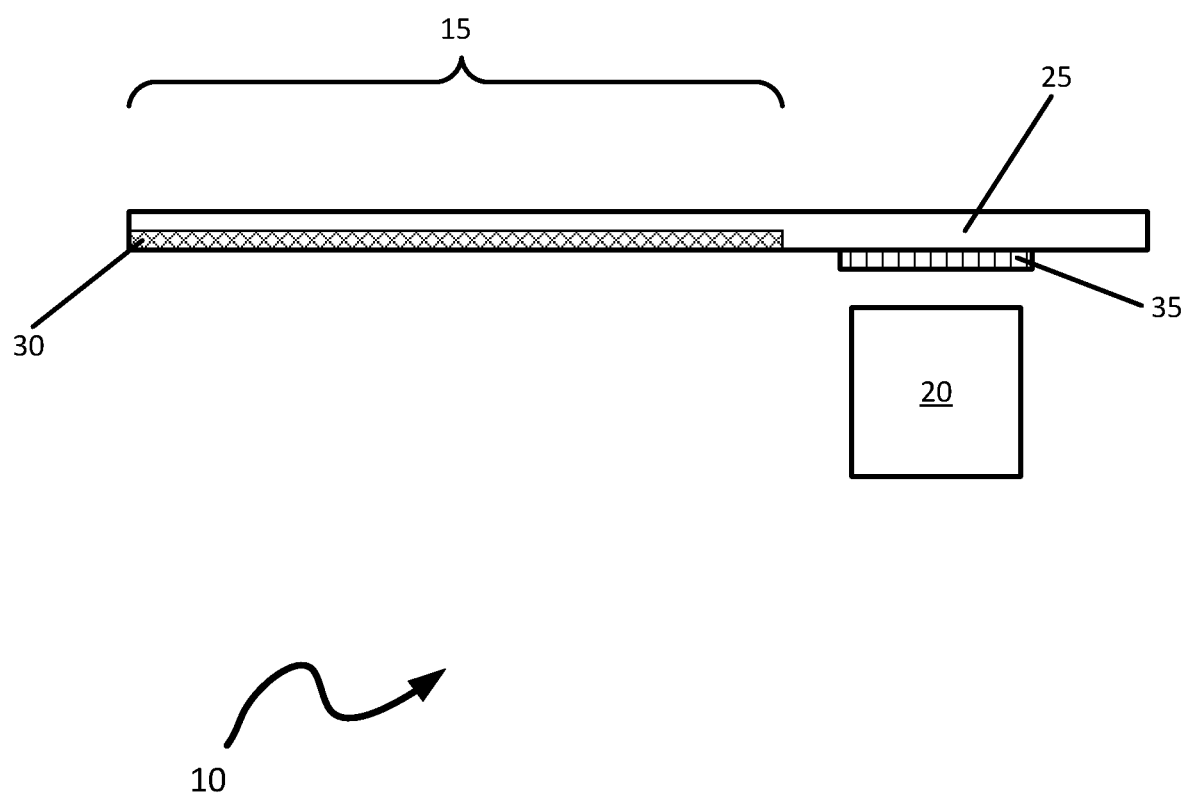
FIG. 1 is a schematic representation of an example apparatus to enhance privacy of a portable electronic device.

Referring to FIG. 1, an apparatus 10 to enhance privacy of a portable electronic device is generally shown at 10. The portable electronic device is not particularly limited. For example, the portable electronic device may be a laptop computer, a tablet, a computer monitor, a television, or other smart device with a display screen and camera. It is to be appreciated that the apparatus 10 may also be used with electronic devices that are not portable. For example, the apparatus 10 may be used for a control panel or display screen on an intercom system. In the present example, the apparatus 10 includes a display portion 15, a camera 20, a thin film transistor substrate 25, an image generation layer 30, and a polymer dispersed liquid crystal 35.

In the present example, the display portion 15 of the apparatus 10 is a portion of the apparatus for generating output. In particular, the display portion 15 may form a display screen where images are to be displayed to a user of the portable electronic device. The display portion 15 is not particularly limited and may include a display to generate the output image. The display may include a display panel or display screen to present visual information. As another example, the display portion 15 may include one or more light emitters and modulating components such as an array of light emitting diodes (LED), liquid crystals, plasma cells, or organic light emitting diodes (OLED). Other types of light emitters and modulators may also be substituted. Furthermore, on many portable electronic devices, a touch membrane may be overlaid on the display portion 15 to provide a touchscreen input device for the portable electronic device. The touch membrane is not limited to any type of touch membrane and may include resistive technology, surface acoustic wave technology, capacitive technology, infrared technology, or optical imaging technology.

The camera 20 is to receive imaging light from the same direction that the display portion 15 is to direct an image to a user from the portable electronic device. For example, the camera 20 may include some optical components, such as lenses, filters, and mirrors, and a charge-coupled device to measure light incident upon a camera pixel. The camera 20 may be used to capture an image of the user and background, such as a selfie, or the camera 20 may be used in combination with display portion 15 for video conferencing. In further examples, the camera 20 may scan field of view to receive commands, such as in the form of a gesture or based on an image such as a barcode or QR code. The gestures detected by the camera 20 are not limited and may include detecting hand gestures from the user.

The thin film transistor substrate 25 is to cover the display portion 15 and the camera 20. In the present example, by extending the thin film transistor substrate 25 over both the display portion 15 and the camera 20, the thin film transistor substrate 25 may provide a support substrate for a circuit to control both the display portion 15 and a polymer dispersed liquid crystal 35 acting as a shutter using a single circuit.

The thin film transistor substrate 25 is not particularly limited and may be made from various materials having similar physical properties. In some examples, the thin film transistor substrate 25 may be made from a transparent material such as indium tin oxide. In other examples, the thin film transistor substrate 25 may be a thin-film polysilicon transistor or an amorphous silicon transistor on a thin-film transistor substrate.

In the present example, an image generation layer 30 is disposed under the thin film transistor substrate 25 within the display portion 15. The image generation layer 30 is not particularly limited and may include any mechanism used to generate an image within the display. For example, the image generation layer 30 may be a pixel matrix having a plurality of electrodes (not shown) to generate a controlled localized electric field. It is to be appreciated that the electric fields may then be used to control a liquid crystal (not shown) in proximity to the electrode to control the amount of light passing therethrough. Furthermore, a color filter substrate may be added for each pixel of the pixel matrix to generate an image for the user of the portable electronic device to view. In other examples, the image generation layer may be an array of light emitting diodes, or a micro-electromechanical system.

The polymer dispersed liquid crystal 35 is disposed between the thin film transistor substrate 25 and the camera 20. The polymer dispersed liquid crystal 35 is a material that may be switched between an opaque state and a clear state. Accordingly, it is to be appreciated that while the polymer dispersed liquid crystal 35 is in the opaque state, the camera 20 is obstructed or blocked from receiving clear imaging light. In the opaque state, the polymer dispersed liquid crystal 35 may scatter or disperse light such that light may not be able to pass through. Therefore, clear imaging light would not be able to reach the camera 20. By contrast, when the polymer dispersed liquid crystal 35 is in a clear state, light is allowed to pass through the polymer dispersed liquid crystal 35 without any interference such that the camera 20 may capture imaging light from the environment above the thin film transistor substrate 25.

The polymer dispersed liquid crystal 35 is not limited and several different types may be used. For example, the concentration of polymer within the polymer dispersed liquid crystal 35 may be from about 30% by weight to about 50% by weight in some examples. The polymer dispersed liquid crystal 35 may be formed by making an emulsion with a specific recipe of polymer and liquid crystal molecules and cured such that droplets of liquid crystal molecules separate out within the polymer structure. While the liquid crystal molecules within each droplet may have a localized order, each droplet can be randomly aligned relative to other droplets of liquid crystal molecules. Accordingly, the combination of droplet size and isotropic orientation variations between the droplets leads to an optically scattering state where light may be allowed to pass through in a scattered state such that the polymer dispersed liquid crystal 35 may effectively act as a shutter for the camera 20 to block light. When an electric current is applied across the polymer dispersed liquid crystal 35, the electric field may align the orientation of the liquid crystal droplets to reduce the degree of optical scattering through the polymer dispersed liquid crystal 35 to provide the clear state.

Accordingly, by controlling the state of the polymer dispersed liquid crystal 35, the polymer dispersed liquid crystal 35 may function as a shutter for the camera 20. As privacy concerns increase due to potential for a portable electronic device to be hacked such that the camera 20 may be activated without the knowledge of the user, a separate shutter to obstruct the camera 20 such that an image cannot be captured may provide enhanced privacy of a portable electronic device to prevent any unauthorized use of the camera 20.

Figure 2:
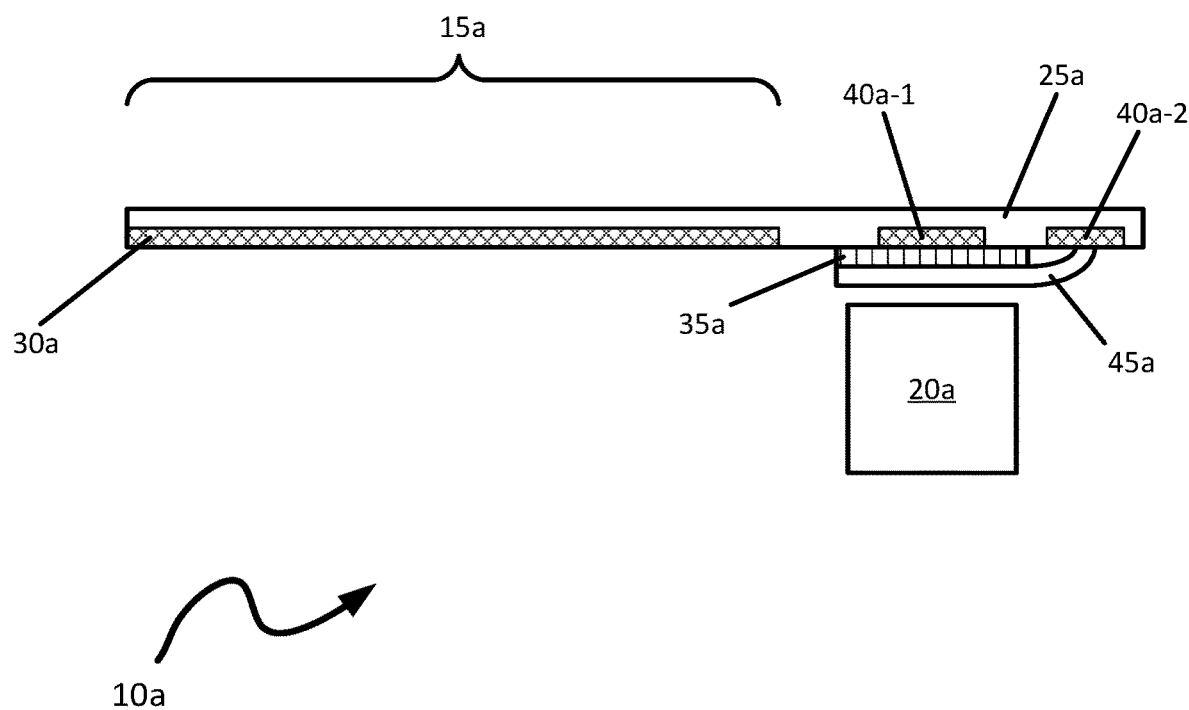
FIG. 2 is a schematic representation of an example apparatus to enhance privacy of a portable electronic device.

Referring to FIG. 2, another apparatus to enhance privacy of a portable electronic device is generally shown at 10a. Like components of the apparatus 10a bear like reference to their counterparts in the apparatus 10, except followed by the suffix "a". The portable electronic device is not particularly limited. For example, the portable electronic device may be a laptop computer, a tablet, a computer monitor, a television, or other smart device with a display screen and camera. In the present example, the apparatus 10a includes a display portion 15a, a camera 20a, a thin film transistor substrate 25a, an image generation layer 30a, a polymer dispersed liquid crystal 35a, terminals 40a-1 and 40a-2 (generically, these terminals are referred to herein as "terminals 40a" and collectively they are referred to as "terminal 40a"), and a shutter substrate 45a.

The display portion 15a is to generate output. In particular, the display portion 15 may be a part of a display screen where images are to be displayed to a user of the portable electronic device. In the present example, the display portion 15a is to interact with a liquid crystal layer (not shown) by applying controlled electric fields via the image generation layer 30a. Accordingly, by transmitting light across the liquid crystal layer, an image may be generated by varying the orientation of the liquid crystals within the liquid crystal layer and applying various filters to exploit the optical properties of the liquid crystals.

The camera 20a is to receive imaging light from the same direction that the display portion 15a is to direct an image to a user from the portable electronic device. In the present example, the camera 20a may be substantially similar to the camera 20. For example, the camera 20a may include some optical components, such as lenses, filters, and mirrors, and a charge-coupled device to measure light incident upon a camera pixel.

The thin film transistor substrate 25a is to cover the display portion 15a and the camera 20a. In the present example, by extending the thin film transistor substrate 25a over both the display portion 15a and the camera 20a, the thin film transistor substrate 25a may provide a support substrate for a circuit to control both the display portion 15a and a polymer dispersed liquid crystal 35a acting as a shutter using a single circuit.

The image generation layer 30a is disposed under the thin film transistor substrate 25a within the display portion 15a. In the present example, the image generation layer 30a may be a pixel matrix having a plurality of electrodes (not shown) to generate a controlled localized electric field to interact with a liquid crystal layer as described above.

Furthermore, the polymer dispersed liquid crystal 35a is disposed between the thin film transistor substrate 25a and the camera 20a. In the present example, the polymer dispersed liquid crystal 35a is to function similarly to the polymer dispersed liquid crystal 35.

The terminals 40a may be disposed on the thin film transistor substrate 25a. The terminals 40a are to provide an electrical connection to the polymer dispersed liquid crystal 35a. In the present example, the terminals 40a are to make an electrical connection on opposite sides of the polymer dispersed liquid crystal 35a. As shown in FIG. 2, both the terminals 40a are disposed on the thin film transistor substrate 25a in the present example. It is to be appreciated that by positioning both terminals 40a on the same thin film transistor substrate 25a, both of the terminals may be connected to the same circuitry as the image generation layer 30a such that the polymer dispersed liquid crystal 35a may be operated by controlling the voltage between the terminals 40a. Furthermore, by connecting the terminals to the image generation layer 30a, fewer wires and/or printed circuitry will be used to control the polymer dispersed liquid crystal 35a.

The manner by which an electrical connection is established between a terminal 40a and the polymer dispersed liquid crystal 35a is not particularly limited. In regard to the terminal 40a-1, the polymer dispersed liquid crystal 35a may be in physical contact with the terminal 40a-1 to form an electrical connection. The polymer dispersed liquid crystal 35a may be soldered to the terminal 40a-1 or another conductive material may be used to improve the electrical contact between the polymer dispersed liquid crystal 35a and the terminal 40a-1.

In regard to the terminal 40a-2, an electrical connection may be formed with the opposite side of the polymer dispersed liquid crystal 35a from which the terminal 40a-1 is connected. In the present example, the apparatus 10a includes a shutter substrate 45a disposed between the polymer dispersed liquid crystal 35a and the camera 20a. The shutter substrate 45a is in electrical communication with the terminal 40a-2 to provide the electrical connection. The manner by which the shutter substrate 45a provides an electrical connection to the terminal 40a-2 is not particularly limited. For example, the shutter substrate 45a may be electrically conductive. In another example, the shutter substrate 45a may be coated with a conductive coating, such as a metallic coating, to improve conductivity on its surface. In further examples, the shutter substrate 45a may be made from similar material as the thin film transistor substrate 25a.

In the present example, the shutter substrate 45a may be made from a flexible material, such as a polymer. It is to be appreciated that the flexibility of the shutter substrate 45a may be to allow the shutter substrate 45a to bend to make contact with the terminal 40a-2. Accordingly, by using a flexible material for the shutter substrate 45a, additional wiring to connect the terminal 40a-2 to the shutter substrate 45a may be reduced or omitted from the apparatus 10b.

Furthermore, by using a polymer or other flexible material, it is to be appreciated that the shutter substrate 45a may be made along with the polymer dispersed liquid crystal 35a. The polymer dispersed liquid crystal 35a may be bonded to the shutter substrate 45a during manufacturing and subsequently attached to the terminal 40a-2 on the thin film transistor substrate 25a. Accordingly, the polymer dispersed liquid crystal 35a may be added to the apparatus after the manufacturing process of the thin film transistor substrate 25a along with the image generation layer 30a, which may involve processes that would be harmful to the polymer dispersed liquid crystal 35a.

Figure 3:
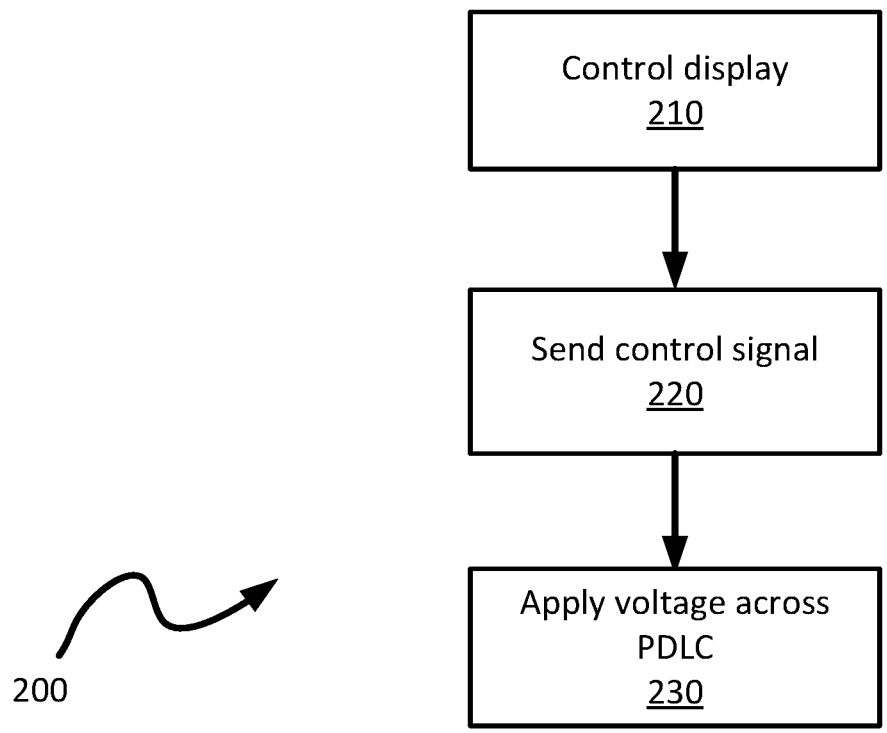
FIG. 3 is a flowchart of an example of a method of enhancing privacy of a portable electronic device.

Referring to FIG. 3, a flowchart of a method of enhancing privacy of a portable electronic device is shown at 200. In order to assist in the explanation of method 200, it will be assumed that method 200 may be performed with the apparatus 10a. Indeed, the method 200 may be one way in which apparatus 10a is used and the following discussion of method 200 may lead to a further understanding of the apparatus 10a along with its various components.

Beginning at block 210, the apparatus 10a is to control a display screen using the image generation layer 30a. In the present example, the image generation layer 30a includes a pixel matrix disposed under the thin film transistor substrate 25a and proximate to a liquid crystal layer. The image generation layer includes a plurality of electrodes to generate a controlled localized electric field at each pixel of the pixel matrix. It is to be appreciated that each pixel may have an electrode generate an electric field that may then be used to control a liquid crystal in the pixel to control the amount of light passing therethrough. Accordingly, a backlight may be used to pass varying amounts of light through the liquid crystal layer to generate an image. In some examples, a color filter substrate may be added to provide color images.

Block 220 involves sending a control signal to the terminals 40a connected to the polymer dispersed liquid crystal 35a. In the present example, the terminals 40a are in electrical communication with the image generation layer 30a. In particular, the terminals 40a may be considered as part of the image generation layer 30a and treated as extra pixels by the controller of the image generation layer 30a. Accordingly, the controls signal may be a voltage across the terminals 40a. For example, the terminal 40a-1 may be a pixel electrode where a control signal may be sent to create a potential difference with a common electrode to which the terminal 40a-2 may be electrically connected. In the present example, the control signal is sent to the terminals via the same connector as the display, such as an embedded display port connector.

By sending the control signal to the terminals 40a, block 230 comprises applying the voltage across the polymer dispersed liquid crystal 35a to switch the polymer dispersed liquid crystal 35a between an opaque state where light is scattered and a clear state where light is allowed to pass through unscattered. When the voltage across the terminals is zero, the polymer dispersed liquid crystal 35 includes liquid crystal droplets that are randomly aligned. While the liquid crystal molecules within each droplet may have a localized order, each droplet can be randomly aligned relative to other droplets of liquid crystal molecules. Accordingly, the combination of droplet size and isotropic orientation variations between the droplets leads to an optically scattering state where light may be allowed to pass through in an opaque state, but no image may be formed. By applying a sufficient voltage across the polymer dispersed liquid crystal 35a, the electric field may align the orientation of the liquid crystal droplets in the polymer dispersed liquid crystal 35a to reduce the degree of optical scattering through to provide the clear state which light may pass through unobstructed.

Therefore, by controlling the voltage across the terminals, the polymer dispersed liquid crystal 35a may be used as a shutter to provide a privacy screen for the camera 20a. When the polymer dispersed liquid crystal 35a is in its opaque state, the polymer dispersed liquid crystal 35a will effectively be a shutter over the camera 20a. Therefore, the camera 20a will not be able to capture meaningful images data and that privacy is maintained when the user does not wish to share images in front of the camera 20a in the event that another party has gained unauthorized access to the camera 20a.

Figure 4:
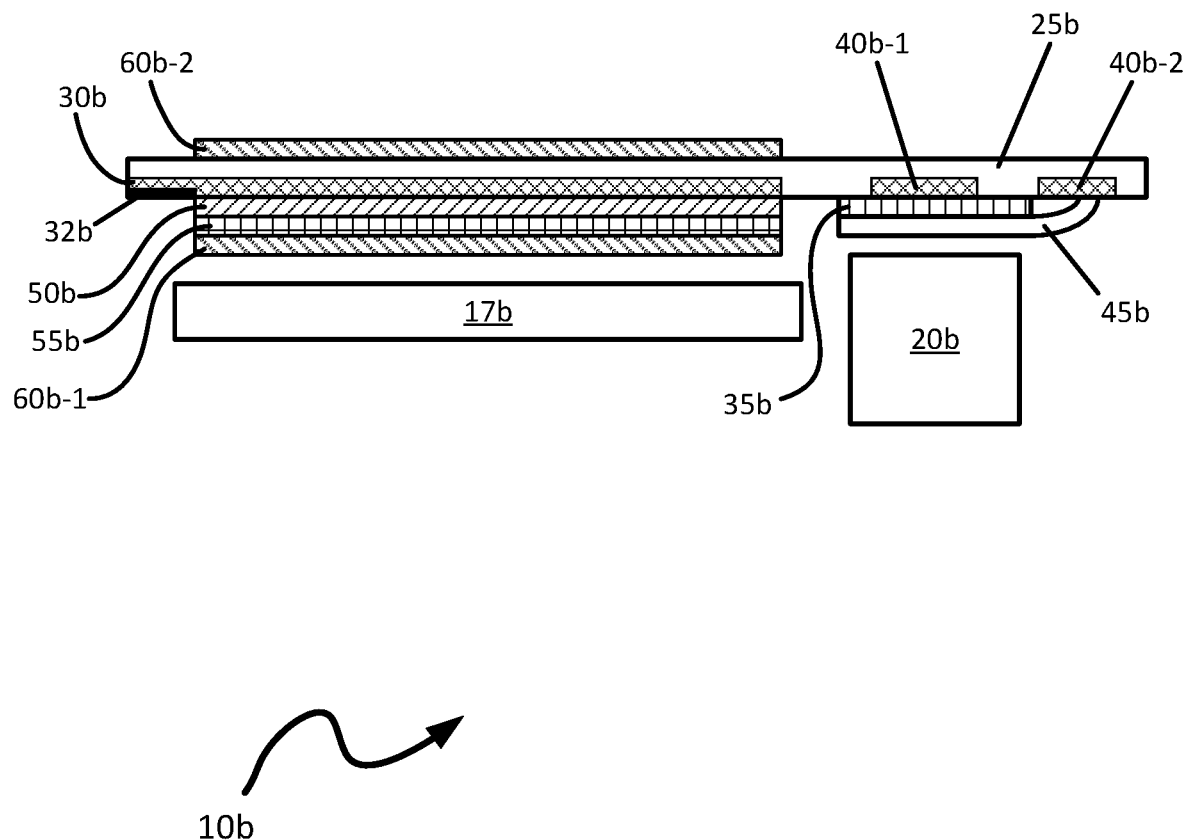
FIG. 4 is a schematic representation of an example apparatus to enhance privacy of a portable electronic device.

Referring to FIG. 4, another apparatus to enhance privacy of a portable electronic device is generally shown at 10b. Like components of the apparatus 10b bear like reference to their counterparts in the apparatus 10a, except followed by the suffix "b". The portable electronic device is not particularly limited. For example, the portable electronic device may be a laptop computer, a tablet, a computer monitor, a television, or other smart device with a display screen and camera. In the present example, the apparatus 10b includes a backlight 17b, a camera 20b, a thin film transistor substrate 25b, a pixel matrix 30b, an embedded display port 32b, a polymer dispersed liquid crystal 35b, terminals 40b-1 and 40b-2 (generically, these terminals are referred to herein as "terminals 40b" and collectively they are referred to as "terminal 40b"), a flexible substrate 45b, a liquid crystal layer 50b, a color filter substrate 55b, and polarizer filters 60b-1 and 60b-2 (generically, these polarizer filters are referred to herein as "polarizer filter 60b" and collectively they are referred to as "polarizer filters 60b").

The backlight 17b is to generate light for the display screen. It is to be appreciated that the backlight 17b is not particularly limited and may include a wide variety of light sources. For example, the backlight may include an array of light emitting diodes. In other examples, the backlight may be a light guide or a lamp with a diffuser to provide substantially uniform light across the area of the display screen.

The camera 20b is to receive imaging light and may be substantially similar to the camera 20a described above. Similarly, the thin film transistor substrate 25b may be substantially similar to the thin film transistor substrate 25a described above. In addition, the polymer dispersed liquid crystal 35b may be substantially similar to the polymer dispersed liquid crystal 35a. Furthermore, the terminals 40b may be similar to the terminals 40a as described above. In the present example, the flexible substrate 45b may be to connect the terminal 40b-2 to the opposite side of the polymer dispersed liquid crystal 35b.

In the present example, the pixel matrix 30b is disposed under the thin film transistor substrate 25a above the backlight 17b. The pixel matrix 30b is not particularly limited and may include a plurality of electrodes to generate a controlled localized electric field for each pixel in the pixel matrix. It is to be appreciated that the electric fields may then be used to control the liquid crystal layer 50a to alter the amount of light passing through each pixel from the backlight 17b toward the user of the portable electronic device.

The manner by which the pixel matrix 30b receives signals and input is not limited. In the present example, the pixel matrix 30b receives signals via an embedded display port 32b. Accordingly, the embedded display port 32b may be connected to a controller and receive electrical signals to manipulate the liquid crystal layer 50b. In addition, since the polymer dispersed liquid crystal 35b is also connected to the same circuit, the same controller may be used to operate the polymer dispersed liquid crystal 35b without additional circuitry or wiring.

The liquid crystal layer 50b is disposed above the color filter substrate 55b and below the pixel matrix 30b. The liquid crystal layer 50b includes crystals with varying optical properties that may be change based on an applied electric field. For example, the electric field may cause the crystals to rotate a polarization of the light, which may be used in combination with polarizer filters 60b to allow light to pass or to block light from passing. For example, if the polarizer filters 60b placed above and below the liquid crystal layer 50b, light will pass through both of the polarizer filters before leaving the display screen to be observed by the user. In the present example, the polarizer filter 60b-1 is disposed between the backlight 17b and the liquid crystal layer 50b and the polarizer filter 60b-2 is disposed above the liquid crystal layer.

Accordingly, if the polarizer filters 60b allow a single polarization of light to pass, the polarizer filters 60b are to be aligned such that the angle or rotation of the light polarization remains the same to pass through both of the polarizer filters 60b assuming the polarization of the light is not changed between the polarizer filters 60b. Therefore, by manipulating the liquid crystals in a pixel with an electric field may cause the polarization of the light from the backlight 17b that has been filtered by the polarizer filter 60b-1 to be changed or rotated. Since the polarizer filters 60b are aligned, the change in polarization of the polarizer filters 60b will stop light from passing through the second polarization filter 60b-2. Accordingly, by manipulating voltages at a pixel within the pixel matrix 30b, the light passing through the liquid crystal layer 50b may be changed pixel by pixel to generate an image. It is to be appreciated that in other examples, the polarizer filters 60b-1 and 60b-2 may be mis-aligned, such as perpendicular or shift by another angle. In these examples, light will not be able to pass through the apparatus unless the liquid crystal layer 50b shifts the polarization by an amount substantially the same as the amount the polarizer filters 60b-1 and 60b-2 are shifted.

The color filter substrate 55b is to select a color for a pixel of the pixel matrix to generate a color image for the user of the portable electronic device to view. The color filter substrate 55b is not particularly limited. In the present example, the color filter substrate 55b may be made from plastic, glass, or other transparent material. The color filter substrate 55b may include elements formed in an array of varying colors, such as red, green, and blue. Accordingly, each pixel in the pixel matrix 30b may be used to control a single color.

Furthermore, it is to be appreciated that in the present example, the thin film transistor substrate 25b is disposed above the liquid crystal layer 50b. In other examples, the thin film transistor substrate 25b may be switched with the color filter substrate 55b such that the pixel matrix 30b controls the liquid crystal layer 50b from the bottom. However, in this example, it is to be appreciated that since the color filter substrate 55b does not extend over the camera 20b, it may generate a visual artifact on the surface.

It should be recognized that features and aspects of the various examples provided above may be combined into further examples that also fall within the scope of the present disclosure.

What is claimed is:

1. An apparatus comprising:
   a display portion where images are displayed;
   a camera portion separate from and laterally adjacent to where images are displayed, the camera portion including a camera;
   a thin film transistor substrate extending over the display portion and the camera;
   an image generation layer disposed under the thin film transistor substrate within the display portion;
   a polymer dispersed liquid crystal separate from the image generation layer, the polymer dispersed liquid crystal disposed between the thin film transistor substrate and the camera, wherein the polymer dispersed liquid crystal is to switch between an opaque state and a clear state, wherein the opaque state is to block the camera from receiving imaging light, and wherein the clear state allows light to pass through the polymer dispersed liquid crystal;
   a first terminal directly on the thin film transistor substrate and electrically connected to a first side of the polymer dispersed liquid crystal; and
   a second terminal directly on the thin film transistor substrate and electrically connected to a second side of the polymer dispersed liquid crystal, wherein the polymer dispersed liquid crystal is switched between the opaque state and the clear state based on a voltage applied across the polymer dispersed liquid crystal via the first terminal and the second terminal.

2. The apparatus of claim 1, further comprising a shutter substrate disposed between the polymer dispersed liquid crystal and the camera, where the shutter substrate is in communication with the second terminal.

3. The apparatus of claim 2, wherein the shutter substrate is flexible to bend and make contact with the second terminal.

4. The apparatus of claim 3, wherein the first terminal and the second terminal are connected to the image generation layer.

5. A method comprising:
controlling a display screen with an image generation layer disposed under a thin film transistor substrate;
sending a control signal to a first terminal and a second terminal, wherein the first terminal and the second terminal are part of the image generation layer and directly on the thin film transistor substrate; and
applying a voltage across a polymer dispersed liquid crystal disposed between the thin film transistor substrate and a camera via the first terminal electrically connected to a first side of the polymer dispersed liquid crystal and the second terminal electrically connected to a second side of the polymer dispersed liquid crystal to switch the polymer dispersed liquid crystal between an opaque state and a clear state.

6. The method of claim 5, further comprising scattering light with the polymer dispersed liquid crystal in the opaque state to disable the camera.

7. The method of claim 6, wherein scattering light comprises sending the control signal to the first terminal and the second terminal via an embedded display port.

8. The method of claim 5, wherein:
controlling the display screen with the image generation layer comprises controlling the display screen over circuitry; and
sending the control signal to the first terminal and the second terminal comprises sending the control signal over the circuitry.

9. An apparatus comprising:
a backlight;
a camera;
a color filter substrate to select a color of light for each pixel;
a liquid crystal layer disposed above the color filter substrate, wherein the liquid crystal layer is to rotate a polarization of light based on an applied electric field;
a thin film transistor substrate disposed above the liquid crystal layer;
a pixel matrix disposed under the thin film transistor substrate, wherein the pixel matrix is to control the liquid crystal layer to generate an image; and
a polymer dispersed liquid crystal disposed between the thin film transistor substrate and the camera, wherein the polymer dispersed liquid crystal is to switch between an opaque state and a clear state, wherein the opaque state is to disable the camera, and wherein the clear state allows light to pass through the polymer dispersed liquid crystal;
a first terminal directly on the thin film transistor substrate and electrically connected to a first side of the polymer dispersed liquid crystal; and
a second terminal directly on the thin film transistor substrate and electrically connected to a second side of the polymer dispersed liquid crystal, wherein the polymer dispersed liquid crystal is switched between the opaque state and the clear state based on a voltage applied across the polymer dispersed liquid crystal via the first terminal and the second terminal.

10. The apparatus of claim 9, further comprising a first polarizer filter disposed between the backlight and the liquid crystal layer, and a second polarizer filter disposed above the liquid crystal layer.

11. The apparatus of claim 10, wherein the liquid crystal layer is to rotate a polarization of light from the first polarizer filter to control whether the light is to pass through the second polarizer filter.

12. The apparatus of claim 10, further comprising:
a flexible substrate to connect the second terminal to the second side of the polymer dispersed liquid crystal.

\* \* \* \* \*